US006752301B1

(12) United States Patent
Drolet

(10) Patent No.: US 6,752,301 B1
(45) Date of Patent: Jun. 22, 2004

(54) COLLAPSIBLE RACK FOR USE IN TRUCK BEDS

(76) Inventor: Thomas A. Drolet, 1109 E. Meadow La., Phoenix, AZ (US) 85022

( * ) Notice: Subject to any disclaimer, the term of this patent is extended or adjusted under 35 U.S.C. 154(b) by 139 days.

(21) Appl. No.: 10/232,116

(22) Filed: Aug. 30, 2002

(51) Int. Cl.[7] .................................................. B60R 9/00

(52) U.S. Cl. ........................... 224/405; 224/403; 296/3; 414/462

(58) Field of Search ................................ 224/403, 405, 224/497, 542, 549; 280/763.1; 296/3; 211/182, 195, 196; 414/462

(56) References Cited

U.S. PATENT DOCUMENTS 3,217,449 A * 11/1965 Levere ....................... 224/403
3,412,867 A 11/1968 Barkow
3,424,487 A 1/1969 Pector et al.
3,719,284 A 3/1973 Rasmusson et al.
4,278,175 A 7/1981 Jackson
4,304,336 A 12/1981 Mays
4,405,170 A 9/1983 Raya
4,770,458 A 9/1988 Burke et al.
4,953,757 A * 9/1990 Stevens et al. ............. 414/462
5,002,324 A 3/1991 Griffin
5,137,320 A 8/1992 Christensen
5,152,570 A 10/1992 Hood
5,190,337 A * 3/1993 McDaniel ...................... 296/3
5,439,152 A 8/1995 Campbell
5,476,301 A 12/1995 Berkich
5,494,327 A 2/1996 Derecktor
5,516,020 A * 5/1996 Lawler et al. .............. 224/405
5,678,743 A 10/1997 Johnson et al.
5,718,344 A * 2/1998 Joldeson et al. ............ 211/182
5,806,905 A 9/1998 Moore
5,836,635 A 11/1998 Dorman
6,027,000 A * 2/2000 Sterzel et al. ............... 224/542
6,186,571 B1 * 2/2001 Burke ........................ 224/405
6,193,123 B1 2/2001 Adamczewski et al.
6,347,731 B1 2/2002 Burger
6,557,917 B1 * 5/2003 Colcombe ...................... 296/3
6,644,704 B1 * 11/2003 Nyberg ....................... 224/405

FOREIGN PATENT DOCUMENTS

GB 2055290 A * 3/1981 ................. 211/195

* cited by examiner

*Primary Examiner*—Gary E. Elkins
(74) *Attorney, Agent, or Firm*—Frank J. McGue

(57) ABSTRACT

A truck rack supports one or more cumbersome items in a truck bed. The truck rack comprises a rectangular frame having two horizontal sides and two vertical sides. The frame has two lower corners and two upper corners. Further, the frame has a pair of opposing legs extend laterally from each of the lower corners and the frame has a pair of opposing articulated arms extending laterally from the upper corners. Each of the opposing articulated arms comprises a plurality of sections joined by hinges.

15 Claims, 4 Drawing Sheets

10
40
36
30
42
16
32
34
70
18
12
24

10
72
70
18
14
42
30
12
16
16
18
30
40

COLLAPSIBLE RACK FOR USE IN TRUCK BEDS

TECHNICAL FIELD

This invention relates in general to a collapsible rack for use in truck beds, and, and, more particularly, to a collapsible rack having foldable and telescoping elements for use in connection with transporting a variety of materials.

BACKGROUND OF THE INVENTION

Pick up trucks are currently used by many businesses for transportation of materials and other objects to and from job sites. Such materials and objects are often cumbersome and difficult to transport in the bed of the truck and thus racks are employed to carry same. Racks are generally affixed directly to the bed of a truck and are not easily removable. Also, such racks occupy much of the bed of the pickup thereby limiting use of the truck bed for transportation of other items. Lastly, such racks are generally configured to carry one item, for example, window panes, and cannot be reconfigured to carry items of differing dimensions.

Thus, there is a need for racks which can collapse during non-use to permit the truck bed to be used for other tasks and to be reconfigured to handle items of differing sizes and configurations. The present invention meets these needs.

Other attempts have been made to address these problems. U.S. Pat. No. 4,304,336 entitled "Interchangeable Glass Rack for Pickup Trucks" which issued on Dec. 8, 1981 to Mays discloses an interchangeable glass rack for pickup trucks.

U.S. Pat. No. 5,439,152 entitled "Extendable Carrier Rack for Pick-up Trucks" which issued on Aug. 8, 1995 to Campbell shows an extendable carrier rack for pickup trucks.

U.S. Pat. No. 5,476,301 entitled "Cargo Securing System Including an Adjustable and Extensible Rack for Trucks" which issued on Dec. 19, 1995 to Berkich provides a cargo securing system including an adjustable and extensible rack for pickup trucks.

U.S. Pat. No. 4,278,175 entitled "Glass Carrying Rack" which issued on Jul. 14, 1981 to Jackson has a glass carrying rack for pickup trucks.

None of the known prior art disclose the device set forth herein.

SUMMARY OF THE INVENTION

It is an object of this invention to provide a rack which can collapsed during non-use to permit the truck bed to be used for other tasks It is a further object of this invention to provide a rack which can be reconfigured to handle items of differing sizes and configurations.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
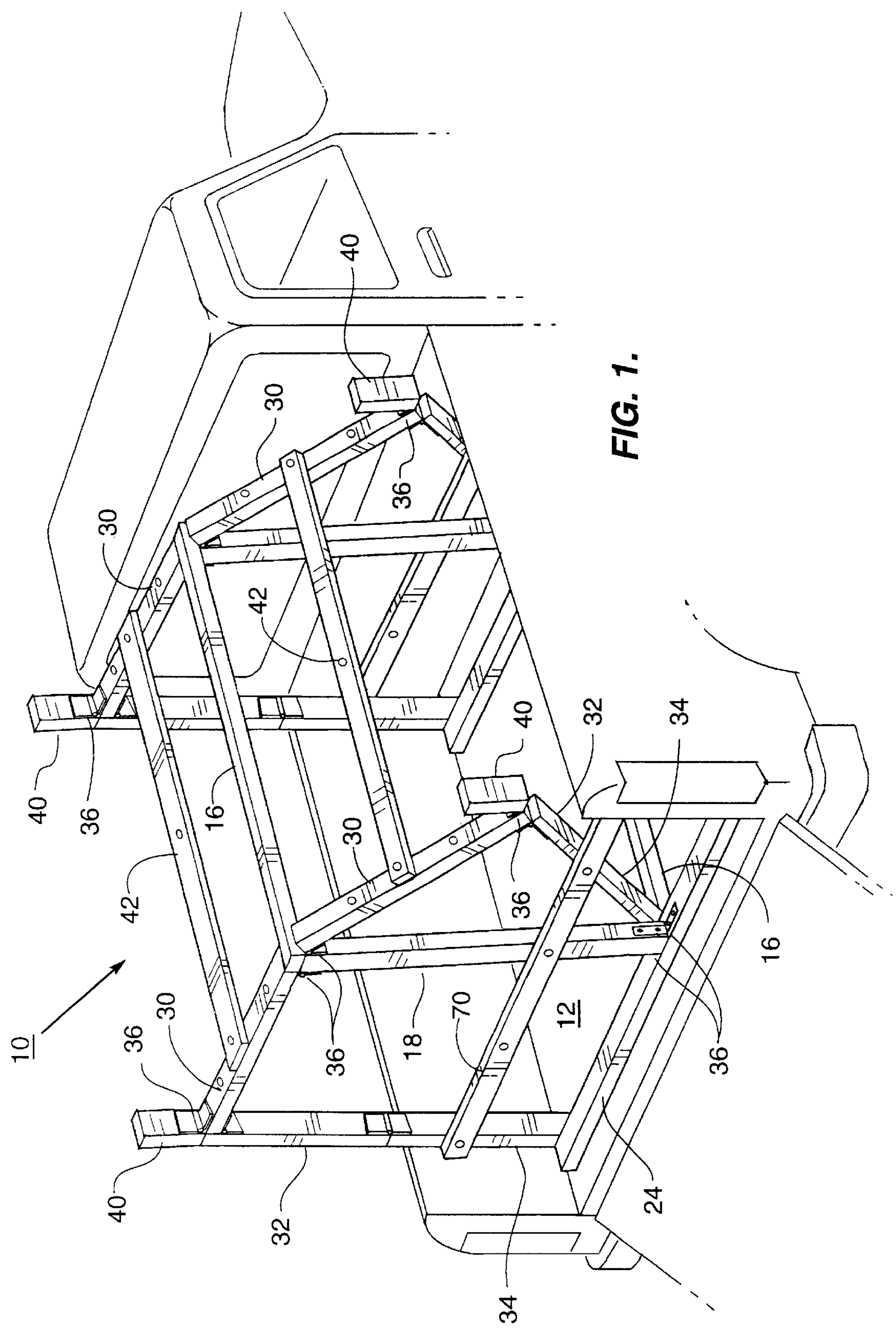
FIG. 1 is a perspective side and rear view of a partially extended rack of the present invention installed in a truck bed.

A rack 10 of the present invention, as seen in FIGS. 1–4, is adapted for supporting one or two cumbersome items in a truck bed 12. As shown, rack 10 is comprised of square tubing though those skilled in the art will recognize that other material, for example, round tubing, PVC. piping, can also be utilized.

Rack 10 comprises a rectangular frame 14 having two horizontal sides 16 and two vertical sides 18. Each horizontal side 16 is divided into two half sides 20*a* and 20*b*, half side 20*a* being telescopically received within half side 20*b*. At each of two lower corners 22 of rectangular frame 14, a pair of opposing legs 24 extend laterally therefrom.

At each of two upper corners 26 of rectangular frame 14, a pair of opposing articulated arms 28 extend laterally therefrom. Each articulated arm 28 has a proximal section 30 abutting frame 14, a middle section 32 and a distal section 34. Each articulated arm 28 further includes three locking hinges 36*a*, 36*b* and 36*c*. Locking hinge 36*a* joins proximal section 30 to frame 14, locking hinge 36*b* joins middle section 32 to proximal section 30 and locking hinge 36*c* joins distal section 34 to middle section 32. Locking hinges 36*a*, 36*b* and 36*c* are discussed further below.

Figure 5:
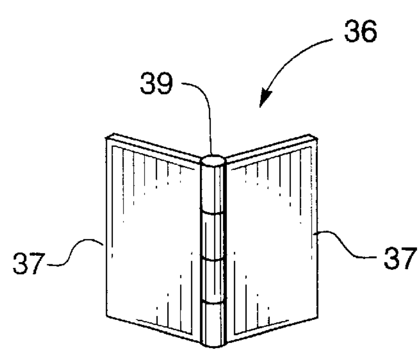
FIG. 5 is a close up perspective view of a hinge used in the present invention.
Figure 6:
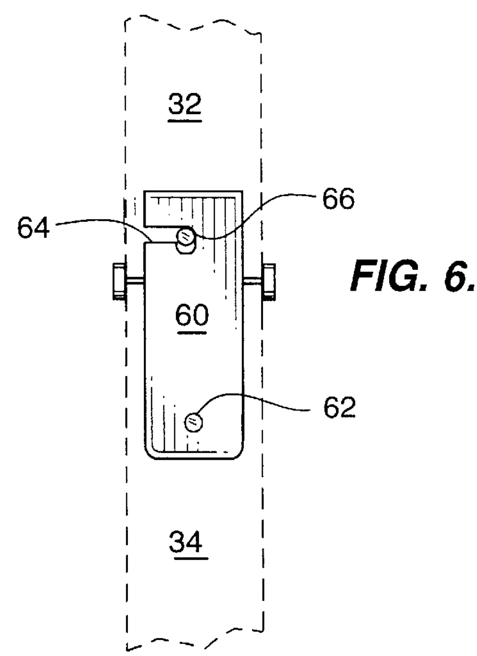
FIG. 6 is a close up side view of a locking plate used in the present invention from the circled area 6 of FIG. 2.

As best seen in FIGS. 5 and 6, locking hinges 36*a–c* are, in the presently preferred embodiment, comprise a combination of a simple butt hinge 36 and a locking plate 60. Butt hinge 36 has mounting plates 37 rotatably connected about a pivot 39.

In the presently preferred embodiment, locking hinge 36*a* is an interior hinge which, at the fullest open position best seen in FIG. 1, has an end of proximal section 30 abutting a side 19 of vertical side 18 and extending horizontally therefrom while. Locking hinge 36*b* is also an interior hinge in which an end of middle section 32 abuts an underside 31 of proximal section 30 and extends downwardly therefrom. Locking hinges 36*a* and 36*b* allow rotation in the direction of arrows 38*a* and 38*b*. Thus, proximal section 30 rotates downwardly towards frame 14 and middle section 32 rotates inwardly towards and outwardly away from proximal section 30. In locking hinge 36*a*, mounting plates 37 are attached to side 19 of vertical side 18 and underside 31 of proximal section 30. In locking hinge 36*b*, mounting plates 37 are attached to underside 31 of proximal section 30 and a side 33 of middle section 32.

In contrast, locking hinge 36*c*, as best seen in FIG. 1, holds an end of distal section 34 aligned and parallel with and abutting an end of middle section 32 whereby distal section extends downwardly therefrom in the fully open position. Locking hinge 36*c* allows 180 degrees of rotation of distal section 34 in the direction of arrow 38*c*, namely, towards middle section 32. In locking hinge 36*c*, mounting plates 37 are affixed to side 33 of middle section 32 and a side 35 of distal section 34.

As best seen in FIG. 6, locking plate 60 is an elongated rectangular shape mounted on distal section 34 having a pivot 62 at one end thereof, preferably a rivet extending from distal section 34, and a recess 64 at the opposite end thereof, recess 64 being adapted to engage a stud 66 extending from middle section 32. When recess 64 is engaged with stud 66, locking plate 60 prevents rotation of distal section 34 with respect to middle section 32 thereby holding said middle section and said distal section in alignment. In locking hinge 36*c*, locking plate 60 is positioned on the opposite sides of middle section 32 and distal section 30 from mounting plates 37.

In locking hinge 36*b*, locking plate 60 is positioned on the side of middle section 32 opposing mounting plate 37 but extending over the end of proximal section 30. When stud 66 is engaged with recess 64, locking plate 60 holds middle section 32 at right angles to proximal section 30. In locking hinge 36*a*, locking plate 60 is positioned on the top side of proximal section 30 but extending over the end of vertical side 18. When stud 66 is engaged with recess 64, locking plate 60 holds proximal section 30 at right angles to vertical side 18.

Further, in the presently preferred embodiment, each proximal section 30 is provided with a support leg 40 which extends opposite middle section 32. Support legs 40 are used to secure loads such as glass sheets and the like during transport.

Two support bars 42, each of which extends between the proximal sections 30 of articulated legs 28 proximate to locking hinges 36*b* provide further structural support for rack 10. Two cross members 70 extend from distal section 34 to vertical side 18 to opposing distal side 34 to provide further structural support for rack 10. Cross members 70 are preferably provided with a plurality of attachment points 72 which allow affixation of cross member 70 in different configuration described below.

Figure 2:
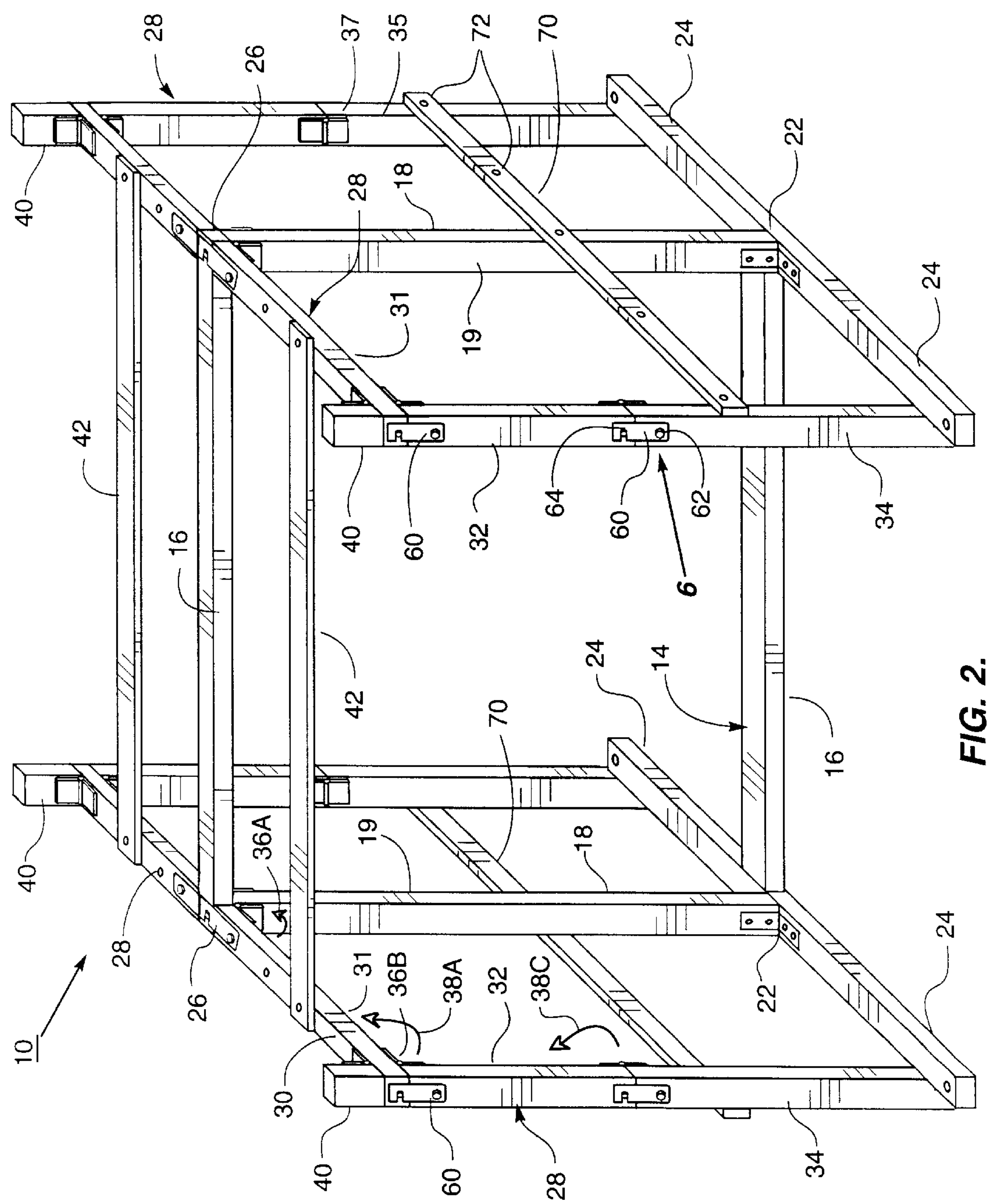
FIG. 2 is a perspective free standing view of the embodiment of FIG. 1.

In the fully extended configuration best seen in FIGS. 1 and 2, the horizontal sides 16 and support bars 42 are extended as far as desired. Next, articulated legs 28 are locked whereby proximal section 30 extends horizontally and laterally from frame 14 parallel to opposing legs 24 and middle section 32 and distal section 34 are locked to extend downwardly from proximal section 30. The configuration of FIG. 1 is particularly well adapted for transporting sheet material such as glass or boards. Cross members are affixed at differing attachment points 72 to accommodate the differing distances involved when in the A-frame configuration.

Figure 3:
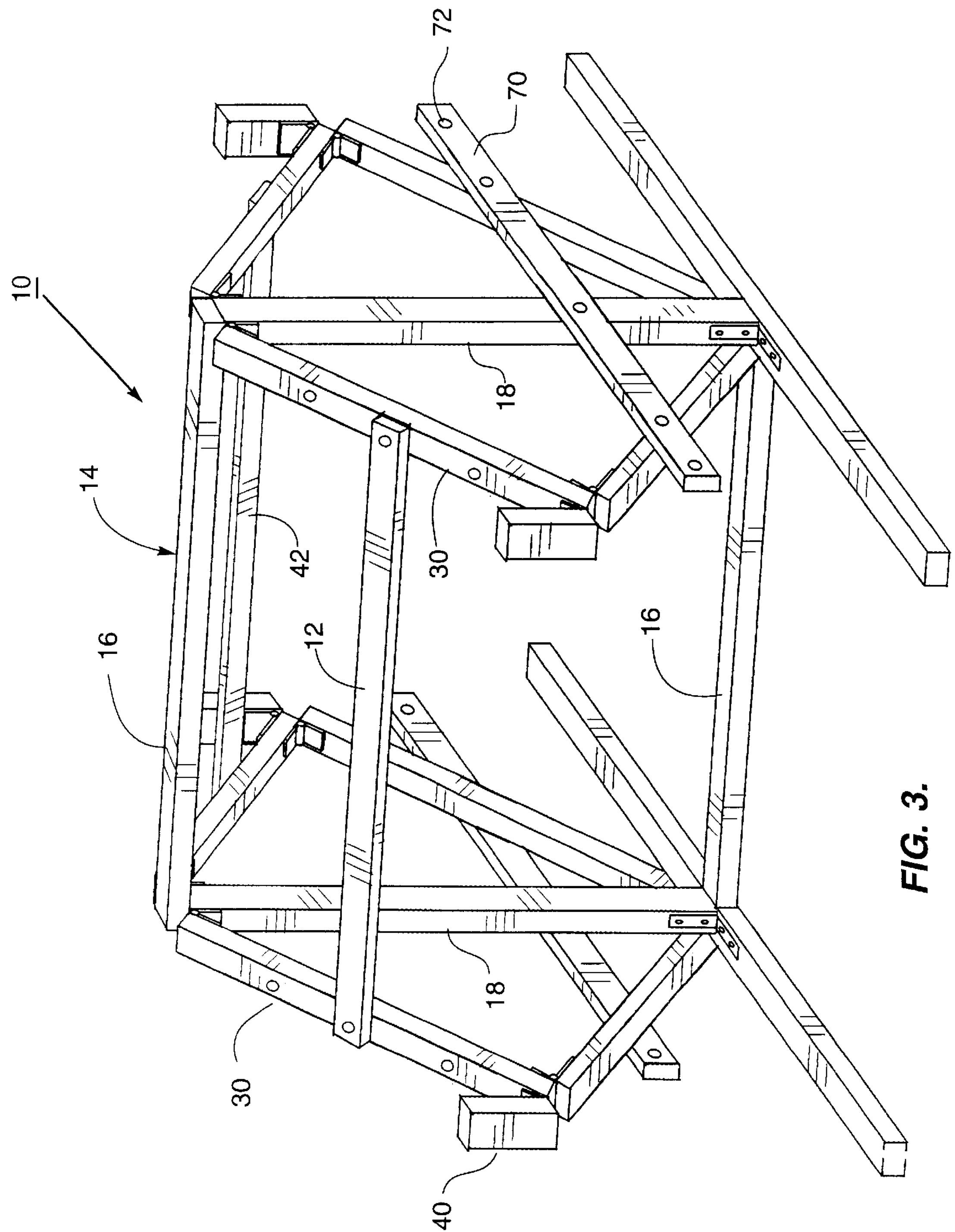
FIG. 3 is a perspective view of the rack of FIG. 2 having two sides thereof fully collapsed.

An A-frame configuration is shown in FIG. 3 wherein articulated legs 28 are locked whereby proximal section 30 extends at a downward angle laterally from frame 14 and middle section 32 extends downwardly therefrom to bed 12. The configuration of FIG. 3 is also well adapted for transporting sheet material such as glass or boards, albeit smaller sizes than that of FIG. 1.

Figure 4:
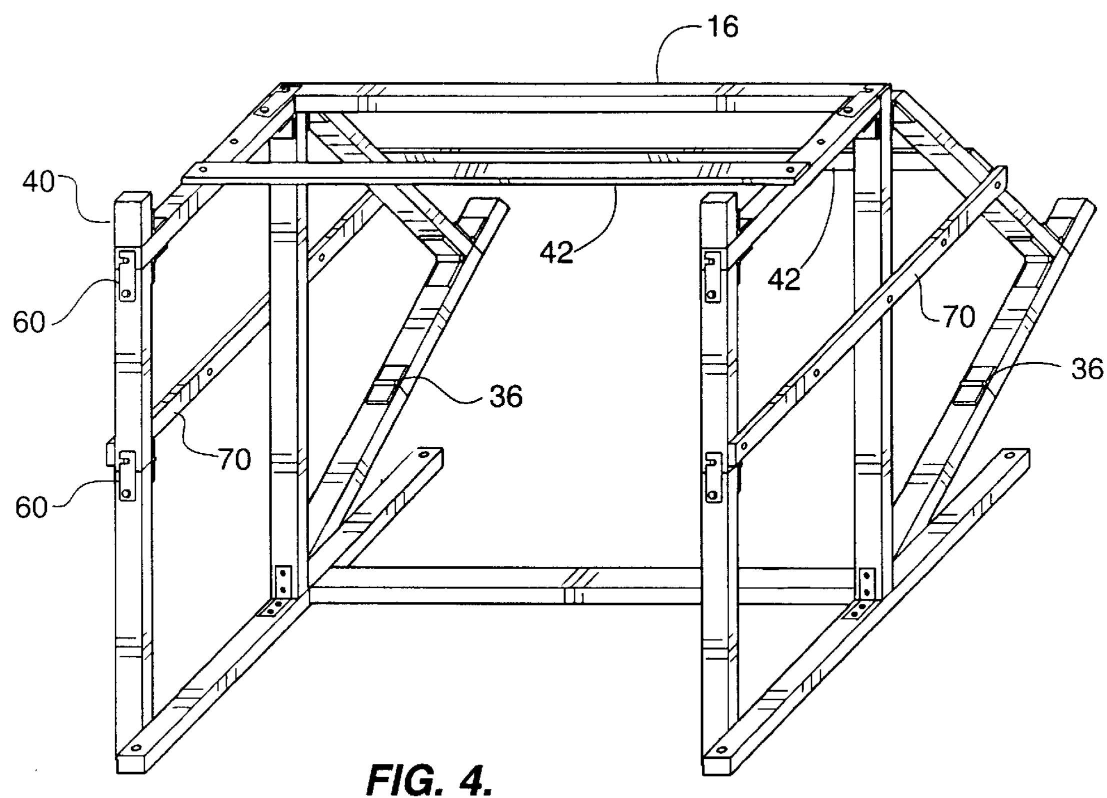
FIG. 4 is a perspective view of the rack of FIG. 2 having one side fully collapsed.

In the partial A-frame embodiment depicted in FIG. 4, one side of rack 10 is fully extended as shown in FIG. 2 while the opposing side is in an A-frame embodiment as shown in FIG. 3. In FIG. 4, note that support bars 42 extend between middle sections 32, not proximal sections 30 as in the previous embodiments.

Another advantage of the present invention is the ability to easily remove device 10 from truck 12 and store in a fully folded construction of FIG. 3.

Although only certain embodiments have been illustrated and described, it will be apparent to those skilled in the art that various changes and modifications may be made therein without departing from the spirit of the invention or from the scope of the appended claims.

What is claimed is:

1. A truck rack supporting one or more cumbersome items in a truck bed comprises a rectangular frame having two horizontal sides and two vertical sides, the frame having two lower corners and two upper corners, the frame having a pair of opposing legs extend laterally from each of the lower corners, the frame having a pair of opposing articulated arms extending laterally from the upper corners, each of the opposing articulated arms comprising a plurality of sections joined by hinges.

2. The truck rack of claim 1 wherein the rack is manufactured from a material selected from the group consisting of square tubing, round tubing, PVC piping.

3. The truck rack of claim 1 wherein each articulated arm has a proximal section joined to the frame by a first hinge, a middle section joined to the proximal section by a second hinge and a distal section joined to the middle section by a third hinge.

4. The truck rack of claim 3 wherein the first and second hinges are hinges wherein the proximal section is adapted to move from a horizontal position from the frame to a downwardly and laterally extending position from the frame and the middle section rotates inwardly and outwardly with respect to the end of the proximal section.

5. The truck rack of claim 4 wherein the third hinge which is adapted to move the distal section from a fully position aligned and parallel with the middle section and a fully closed position abutting and parallel with the middle section.

6. The truck rack of claim 5 further comprising support legs mounted on each of the proximal sections extending oppositely the corresponding middle section, the support legs adapted to engage cumbersome items.

7. The truck rack of claim 3 further comprising two support bars, each of the support bars extending between two of the articulated legs on one side of the frame.

8. The truck rack of claim 7 wherein the support bars extend between the proximal sections of the articulated legs.

9. The truck rack of claim 7 wherein the support bars extend between the middle sections of the articulated legs.

10. The truck rack of claim 7 further comprising cross members between opposing middle sections of the articulated legs.

11. The truck rack of claim 10 further comprising support legs mounted on each of the middle sections extending oppositely the corresponding distal section, the support legs adapted to engage cumbersome items.

12. A truck rack supporting one or more cumbersome items in a truck bed comprises:

a rectangular frame having two horizontal sides and two vertical sides, the frame having a pair of opposing legs extend laterally from each of the lower corners, the frame having a pair of opposing articulated arms extending laterally from the upper corners, each of the opposing articulated arms comprising a proximal section joined to the frame by a first hinge, a middle section joined to the proximal section by a second hinge and a distal section joined to the middle section by a third hinge wherein the proximal section is adapted to move from a horizontal position from the frame to a downwardly and laterally extending position from the frame and the middle section rotates inwardly and outwardly with respect to the end of the proximal section and the distal section rotates from a fully position aligned and parallel with the middle section and a fully closed position abutting and parallel with the middle section, support legs mounted on each of the proximal sections extending oppositely the corresponding middle section, the support legs adapted to engage cumbersome items, two support bars, each of the support bars extending between two of the articulated legs on one side of the frame, each support bar having two halves, one half being telescopically received within the other half.

13. The truck rack of claim 12 wherein the rack is manufactured from a material selected from the group consisting of square tubing, round tubing, PVC piping.

14. The truck rack of claim 12 wherein the support bars extend between the proximal sections of the articulated legs.

15. The truck rack of claim 12 wherein the support bars extend between the middle sections of the articulated legs.

* * * * *